US008544025B2

(12) United States Patent
Bhandiwad et al.

(10) Patent No.: US 8,544,025 B2
(45) Date of Patent: Sep. 24, 2013

(54) EFFICIENT DATA TRANSFER ON LOCAL NETWORK CONNECTIONS USING A PSEUDO SOCKET LAYER

(75) Inventors: Pramod Achyut Bhandiwad, Bangalore (IN); Mallesh Lepakshaiah, Bangalore (IN); Prithvi Srihari, Bangalore (IN); Sivakumar Krishnasamy, Dharmapuri (IN)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 12/844,916

(22) Filed: Jul. 28, 2010

(65) Prior Publication Data

US 2012/0030687 A1    Feb. 2, 2012

(51) Int. Cl.
  *G06F 3/00*     (2006.01)
  *G06F 9/44*     (2006.01)
  *G06F 9/46*     (2006.01)
  *G06F 13/00*    (2006.01)

(52) U.S. Cl.
  USPC .......................................... 719/312; 719/314

(58) Field of Classification Search
  USPC .................................. 719/312, 314
  See application file for complete search history.

(56) References Cited

U.S. PATENT DOCUMENTS

| 6,829,662 | B2 * | 12/2004 | King-Smith et al. | 710/56 |
| 2002/0078135 | A1 * | 6/2002 | Venkatsubra | 709/202 |
| 2005/0165932 | A1 * | 7/2005 | Banerjee et al. | 709/226 |
| 2007/0233876 | A1 * | 10/2007 | Thompson | 709/227 |
| 2008/0155103 | A1 * | 6/2008 | Bailey | 709/227 |
| 2011/0010723 | A1 * | 1/2011 | Okabe | 719/312 |

FOREIGN PATENT DOCUMENTS

EP              95306980         9/2002

OTHER PUBLICATIONS

Gan et al., "An Efficient Communication Infrastructure for IBM Cyclops-64 Computer System," Technical Memo 66, Department of Electrical and Computer Engineering, University of Delaware, Jun. 2006.
Hodson et al., "An Architecture for Reconfigurable Computing in Space," Military and Aerospace Applications of Programmable Devices and Technologies Conference (MAPLD), 2005.
Ganger et al., "Fast and Flexible Application-Level Networking on Exokernel Systems," ACM Transactions on Computer Systems, vol. 20, No. 1, Feb. 2002, pp. 49-83.

\* cited by examiner

*Primary Examiner* — Emerson Puente
*Assistant Examiner* — Kimbleann Verdi
(74) *Attorney, Agent, or Firm* — Francis Lammes; Stephen J. Walder, Jr.; Diana R. Gerhardt (57) ABSTRACT

A method, system and computer program product for transferring data between two applications over a local network connection. The invention establishes a socket connection between the applications and transfers data through the socket connection using a pseudo socket layer interface when the two endpoints of the socket connection are on the same host. Socket application program interface comprises socket buffers for sending and receiving data. A connecting application identifies and establishes a connection with a listening socket, and places data directly in the socket receive buffer of the receiving socket. If the other end of the socket connection is on a remote host, then data is transferred using underlying network facilities.

19 Claims, 9 Drawing Sheets

EFFICIENT DATA TRANSFER ON LOCAL NETWORK CONNECTIONS USING A PSEUDO SOCKET LAYER

FIELD OF THE INVENTION

The invention relates to computer networks, and more particularly, to an efficient method and system for transferring data on local network connections through a pseudo socket layer.

BACKGROUND

In existing networking applications, an operating system generally follows a normal protocol processing for network data packets even if the destination of these packets is an application running on the same host as that of the sending application. This processing imposes an unnecessary burden on the host in terms of protocol processing and copying of data to and from system memory. New interconnect technology, such as InfiniBand and TCP Offload Engines, has proposed various solutions for reducing data copying in memory and offloading the protocol processing to specialized hardware. However, these solutions still do not reduce or eliminate overheads due to data copying in memory and protocol processing associated with data transfers within the host itself.

For database servers and web application servers in which most of the network connections between applications are on local hosts and performance is major concern, there is even a greater need for an efficient data transfer mechanism among these applications. This is also true for two processes in the same application that communicate through a network protocol, such as TCP/IP, to reduce performance impact caused by network protocol processing.

There is thus a need for a system and method for efficiently transferring data between two applications or processes using a network protocol when the applications or processes run on the same host computer.

SUMMARY

The invention relates to a method, system and computer program product for transferring data between two applications over a local network connection. The exemplary embodiments of the invention establish a socket connection between the applications, and transfer data between the applications through the socket connection using a socket application program interface if the endpoints of the socket connection are on the same host computer. The socket application program interface includes local socket buffers for sending and receiving data. The connecting application identifies and establishes a connection with a listening socket, and places data in a socket receive buffer of the receiving socket. If the other end of the socket connection is on a remote host, then data is transferred using existing send and receive functions of the underlying network.

The details of the embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION OF THE INVENTION

The present invention comprises an efficient method, system and computer program product for transferring data between two applications, or two processes in the same application, using a pseudo socket layer to minimize overheads associated with network protocol processing and data copying. The invention eliminates the processing normally performed for the transport layer, network layer, and data link layer in a typical network model when the data transfer is through a local connection.

Figure 1:
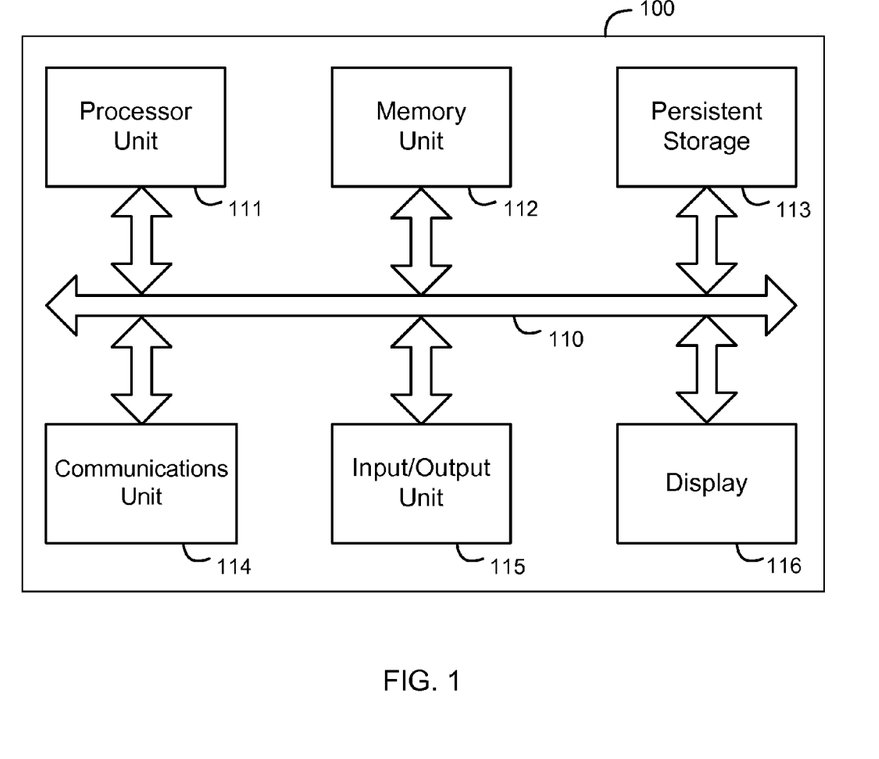
FIG. 1 is a block diagram of a typical data processing system in which aspects of the present invention might be implemented.

Referring now to the drawings and in particular to FIG. 1, there is depicted a block diagram of a data processing system in which aspects of the present invention may be implemented. Data processing system 100 includes a processor unit 111, a memory unit 112, a persistent storage 113, a communications unit 114, an input/output unit 115, a display 116 and a system bus 110. Computer programs are typically stored in the persistent storage 113 until they are needed for execution, at which time the programs are brought into the memory unit 112 so that they can be directly accessed by the processor unit 111. The processor unit 111 selects a part of memory unit 112 to read and/or write by using an address that the processor 111 gives to memory 112 along with a request to read and/or write. Usually, the reading and interpretation of an encoded instruction at an address causes the processor 111 to fetch a subsequent instruction, either at a subsequent address or some other address. The processor unit 111, memory unit 112, persistent storage 113, communications unit 114, input/output unit 115, and display 116 interface with each other through the system bus 110.

Figure 2:
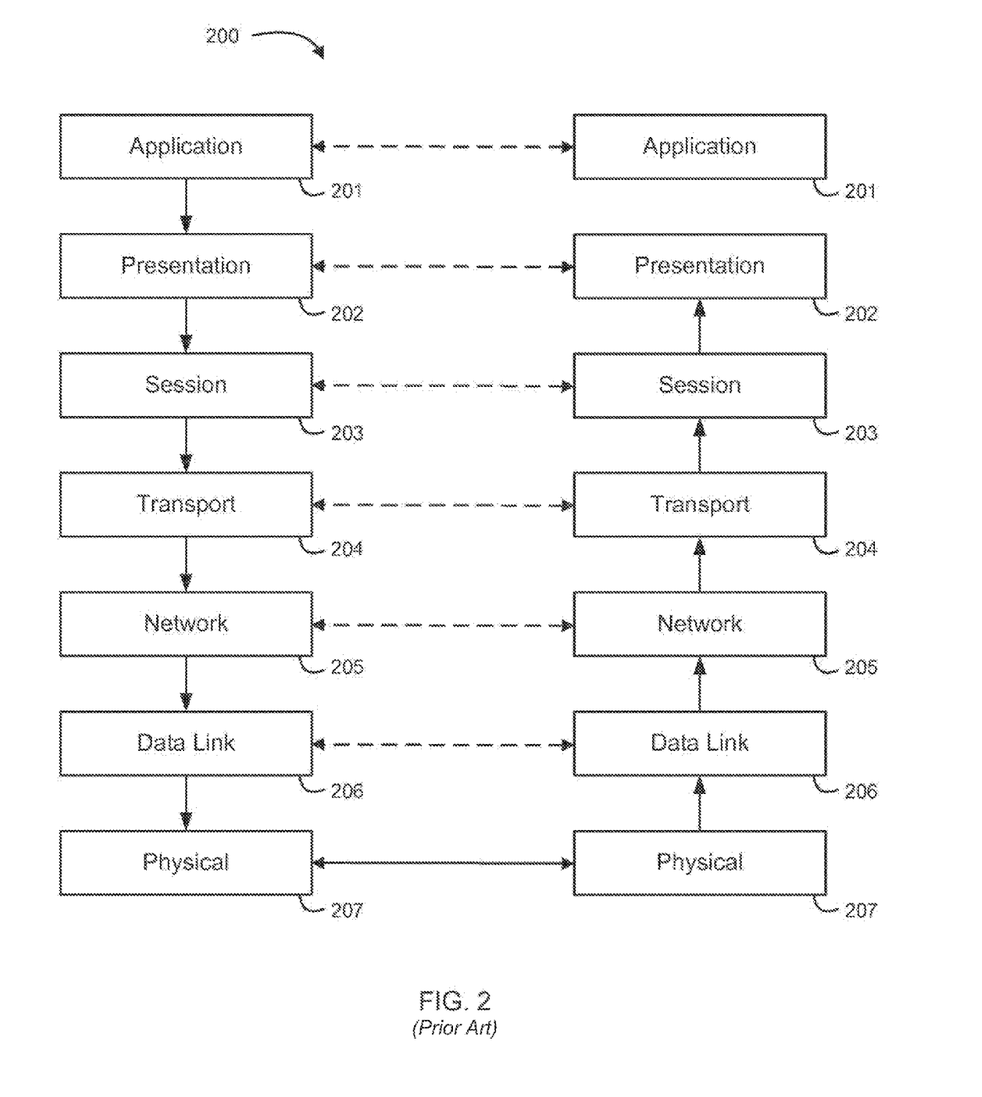
FIG. 2 is a block diagram illustrating the network layers in an Open Systems Interconnection (OSI) Reference model.

FIG. 2 illustrates a block diagram of the Open Systems Interconnection Reference model (OSI model) 200. The OSI model 200 is a layered abstract description for communications and computer network protocol design, developed as part of the Open Systems Interconnection initiative. The OSI model 200 is described, for example, in the paper entitled "OSI Reference Model—The ISO Model of Architecture for Open Systems," by Hubert Zimmermann, IEEE Transactions On Communications, 1980. By dividing the communication software into layers, the protocol stack 200 allows division of labor and ease of implementation. Layers communicate with those above and below through well-defined interfaces. These layers provide a service for the layer directly above it and makes use of services provided by the layer directly below it. Even though OSI model defines seven layers (Application 201, Presentation 202, Session 203, Transport 204, Network 205, Data link 206, and Physical 207), some of the layers are combined into one layer in the Transmission Control Protocol and the Internet Protocol (TCP/IP).

Figure 3:
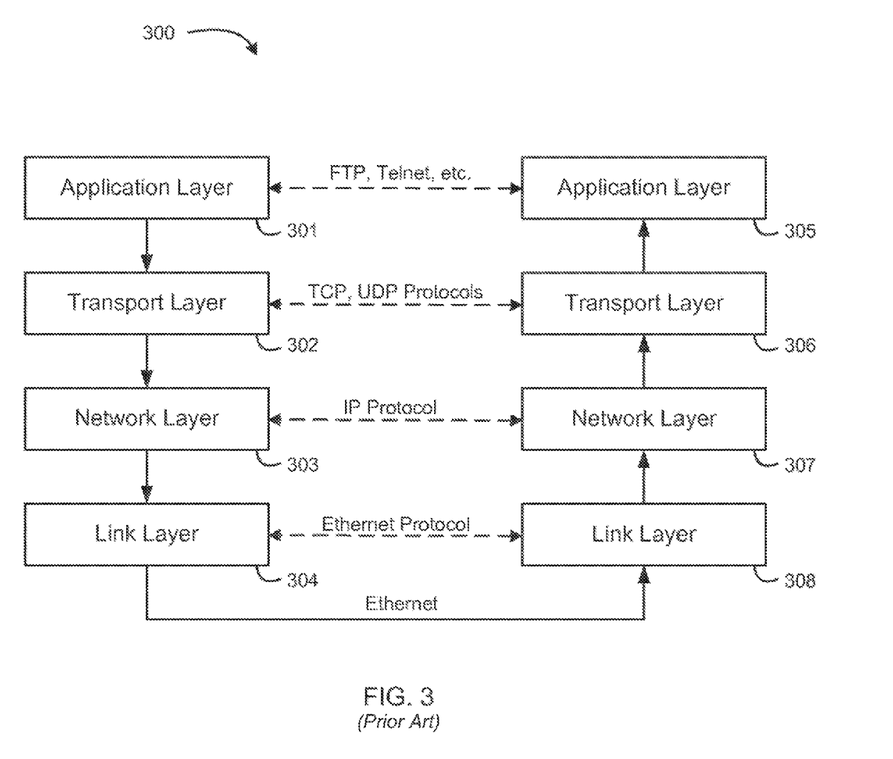
FIG. 3 is a block diagram representing the network layers in the Transmission Control Protocol and the Internet Protocol (TCP/IP) model.

FIG. 3 is a block diagram representing of the TCP/IP network model. The TCP/IP model has four layers as part of its protocol stack: Application layer (301, 305), Transport layer (302, 306), Network layer (303, 307) and Link layer (304, 308). The Application layer (301, 305) refers to the highest level interfaces used by most applications for network communication, such as file transfer protocols (FTP, Telenet, etc.) and email protocols. Data coded according to application layer protocols is encapsulated into one or more Transport layer (302, 306) protocols such as the Transmission Control Protocol (TCP) and the User Datagram Protocol (UDP). The Transport layer protocols TCP and UDP in turn use lower layer protocols in the TCP/IP model to carry out the data transfer. Socket application programming interface (API) programs provide the interface between an application and the Transport layer.

The functions of the Transport layer (302, 306) include end-to-end message transfer capabilities independent of the underlying network, along with error control, fragmentation, and flow control. The Network layer (303, 307), which is the Internet Protocol (IP) in TCP/IP mode, handles transfer of information across networks through network components such as routers and gateways. The Link layer (304, 308) is the interface to the actual network hardware and allows network traffic to flow through various physical networks, for example, an Ethernet.

Figure 4:
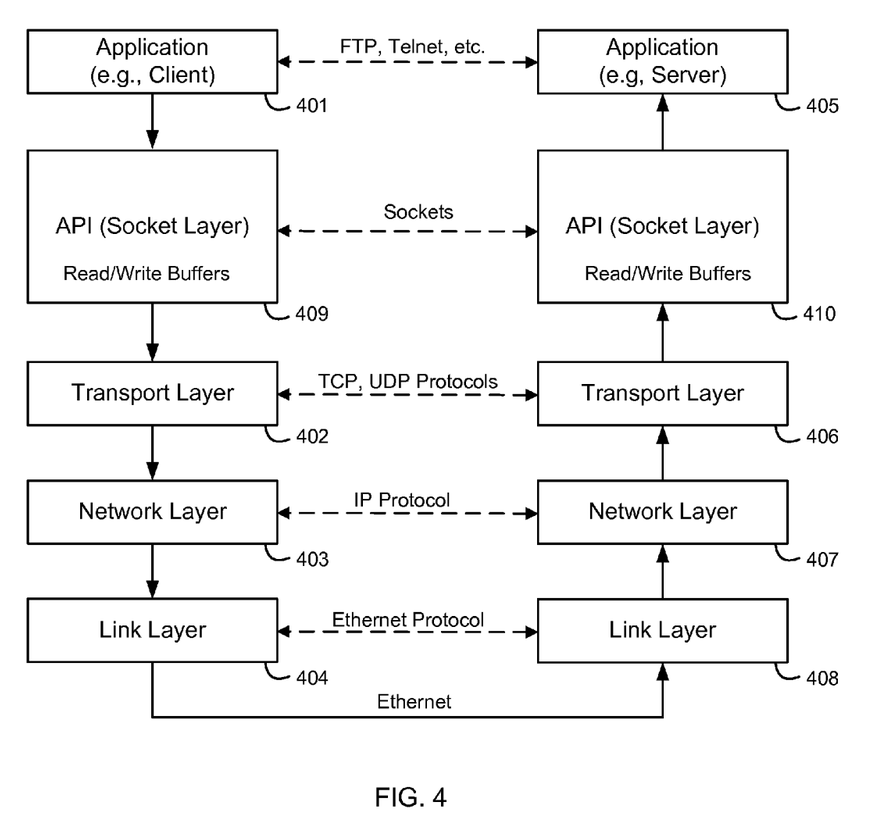
FIG. 4 is a block diagram illustrating two exemplary host applications, a client application and a server application, communicating with each other through socket APIs and TCP/IP protocols, in accordance with aspects of the present invention.

FIG. 4 illustrates an example of two host applications, a client application 401 and a server application 405, communicating with each other through socket APIs and TCP/IP protocols, in accordance with aspects of the present invention. Although the example uses client and server applications for explaining the operations involved in the network connection, these operations and connection are applicable to any two applications or processes that use the network for communication. Client and server applications 401, 405 interact with the network layers 402-404, 406-408 of the TCP/IP protocol through socket application program interfaces (APIs) 409-410. Application programs 401, 405 run in application layer of the TCP/IP network stack and are enabled to access various hardware devices through use of socket APIs 409-410 that support those devices. The APIs operate in a socket API layer which provides logical to physical device interface mapping.

The communication between applications 401 and 405 starts with the creation of a socket, i.e., one of the two endpoints of a socket connection between the two applications. A socket is a software entity that provides the basic building block for interprocess communications, and functions as an endpoint of communication between application processes. A socket uniquely identifies a connection between two communicating sides by the identifier <network address, network port>. The network address refers to the address of the entity creating the socket, e.g., an application process, and network port refers to a communications port of this entity as known to other entities in the network. The creation of a socket binds an object (i.e., a processor or a peripheral device) to an address used for communicating with the object.

Sockets may generally be created by the underlying operating system (not shown) in which the application is running. Once a socket is created, an application process may connect with another socket associated with another application process and thus establish a network connection with the other application process. Once the socket connection has been established between two applications or two application processes, messages and data can be sent between the applications or processes using a selected network transmission protocol, e.g., TCP or UDP.

As shown in FIG. 4, a socket is a component of an application program interface (API) that allows applications running on data processing systems in a network to communicate with each other. It identifies a communication end point in a network and can be connected to other sockets in the network. An application or process may place data in a socket that it has created and sends data to another socket connected to the first socket, and thus transmit data to another application or process that has established the second socket. These sockets hide the protocol of the next lower layer in the underlying network architecture from the processes when performing the communication between the processes. This lower network layer may be a stream connection model (e.g., TCP), a datagram model (e.g., UDP) or another model. A stream connection model refers to a data transmission in which the bytes of data are not separated by any record or marker. A datagram model refers to data transmission in the form of data packets.

The socket interface may be different based on the network services that are provided. Stream, datagram, and raw sockets each define a different service available to applications and are summarized as follows.

Stream socket interface (SOCK_STREAM): This socket interface defines a reliable connection-oriented service, for example, over the TCP protocol. Data is sent without errors or duplication and is received in the same order as it is sent. Flow control is built-in to avoid data overruns. No boundaries are imposed on the exchanged data, which is considered to be a stream of bytes. An example of an application that uses stream sockets is the File Transfer Program (FTP).

Datagram socket interface (SOCK_DGRAM): This type of socket interface defines a connectionless service, for example, over UDP. Datagrams are sent as independent packets. The service provides no guarantees; data can be lost or duplicated, and datagrams can arrive out of order. No disassembly and reassembly of packets is performed. An example of an application that uses datagram sockets is the Network File System (NFS).

Raw socket interface (SOCK_RAW): Raw socket interface allows direct access to lower-layer protocols such as IP and ICMP. This interface is often used for testing new protocol implementations. An example of an application that uses raw sockets is the Ping command.

When server application 405 is running on a host computer different than the one hosting client application 401, the client and server applications 401, 405 may use existing network facilities, e.g., TCP/IP, to transfer data between them. However, when both the client application 401 and server application 405 are on the same host, the invention transfers data through pseudo socket layer 409-410 without incurring processing overheads due to the Transport, Network and Data link layers. The pseudo socket layer 409-410 provides socket application programming interfaces (APIs) as well as read and write buffers for transferring data from one end of the network connection to the another end of the network connection when the remote end is on the same host. The presence of the pseudo socket layer does not affect the application layer as well as other TCP/IP network layers. The applications 401, 405 may use same socket system calls (e.g., socket, connect, send, recv, etc.) for data transmission as if the pseudo socket layer is not present. The invention requires no recompilation of applications or changes to the implementation of the TCP/IP layers.

Figure 5:
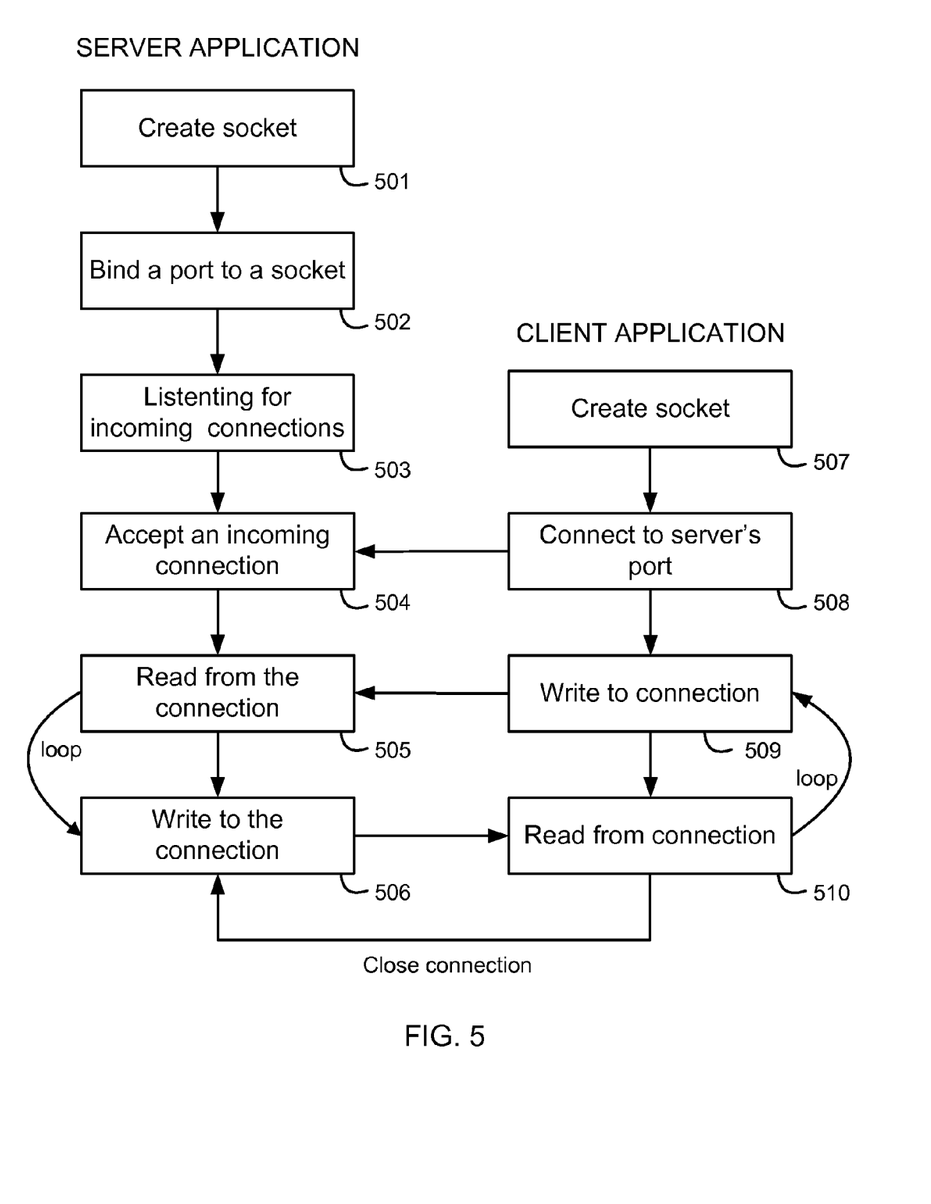
FIG. 5 illustrates an exemplary process for establishing sockets, a socket connection, and sending and receiving data by client and server applications using the TCP protocol for the transport network layer.

FIG. 5 illustrates the processes for establishing sockets and a network connection between two applications, and for sending and receiving data by the applications using the TCP protocol as a transport network layer. The applications initiate these processes by making system calls to a socket application programming interface that the applications use to interact with the network. A client application or a server application may create a socket for communication using "socket" system calls 501 or 507, respectively. A socket call creates an endpoint for the invoking application to communicate with the other end of a socket connection once this connection is established. The socket system call returns a socket descriptor which is used in all subsequent socket-related system calls by the invoking application to identify the socket being used for communication. In the illustrated processes, the server application initially creates a socket, at block 501, and binds one of its communications port to that socket, at block 502. The server application then listens for incoming connections from other applications, e.g., a client application that wants to communicate with the server application, per block 503.

In order to communicate with the server application, the client application also creates a socket, at block 507. It then sets up a communication link between the client socket and the server socket by making a "connect" system call to the API with the network address of server as a call parameter, at block 508. If the initiating socket is a TCP socket, i.e., the socket type being SOCK_STREAM in the parameters of the "socket" system call, then the "connect" system call attempts to make a connection to the socket specified by the "Name" parameter in the "connect" system call. If the initiating socket is a UDP socket, i.e., the socket type being SOCK_DGRAM in the parameters of the "socket" system call, then the "connect" system call establishes a peer address for the socket connection. The peer address identifies a socket where all datagrams will be sent to in subsequent send requests from the client application and the server applications. The "connect" system call may have the following format.

```
int connect ( Socket , Name , NameLength )
int Socket ;
const struct sockaddr *Name ;
socklen_t NameLength;
```

Upon receiving a connection request from the client application, the server application accepts the client request at block 504 to establish the connection between the server socket and the client socket. The client application can then send (write) data to the server application, per block 509. On the other end of the connection, the server application can receive (read) the data sent by the client, per block 505. Further, the server application may also send data to the client (in block 506) and the client may receive data from the server (in block 510) through the established socket connection. The client and server applications may remain in the data transmission loop as long as necessary until either the client application or server application closes the connection.

Figure 6:
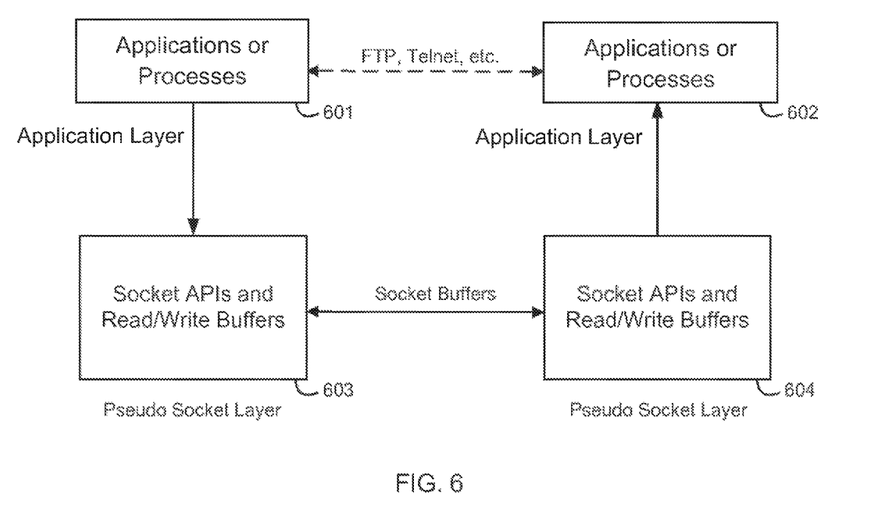
FIG. 6 is a block diagram showing a pseudo socket layer with socket APIs and read-write buffers to support data transfer between two application processes on the same host, in accordance with an exemplary embodiment of the invention.

FIG. 6 illustrates a generalized model of a pseudo socket layer with socket APIs and read-write buffers to support data transfer between two application processes the same host, in accordance with aspects of the present invention. As described above with reference to FIGS. 4 and 5, when the two endpoints of a network connection are on the same host, the applications or processes 601-602 at the endpoints of the connection communicate with each other through the pseudo socket layer 603-604, rather than the underlying network stack. As in the case of a remote host, these applications and processes 601-602 create sockets and establish a socket connection by making system calls as described above. Socket APIs 603-604 intercept these system calls by the applications and perform data transfer between the two ends of the connection using socket buffers, read buffer, and write buffer provided in the APIs.

Figure 7:
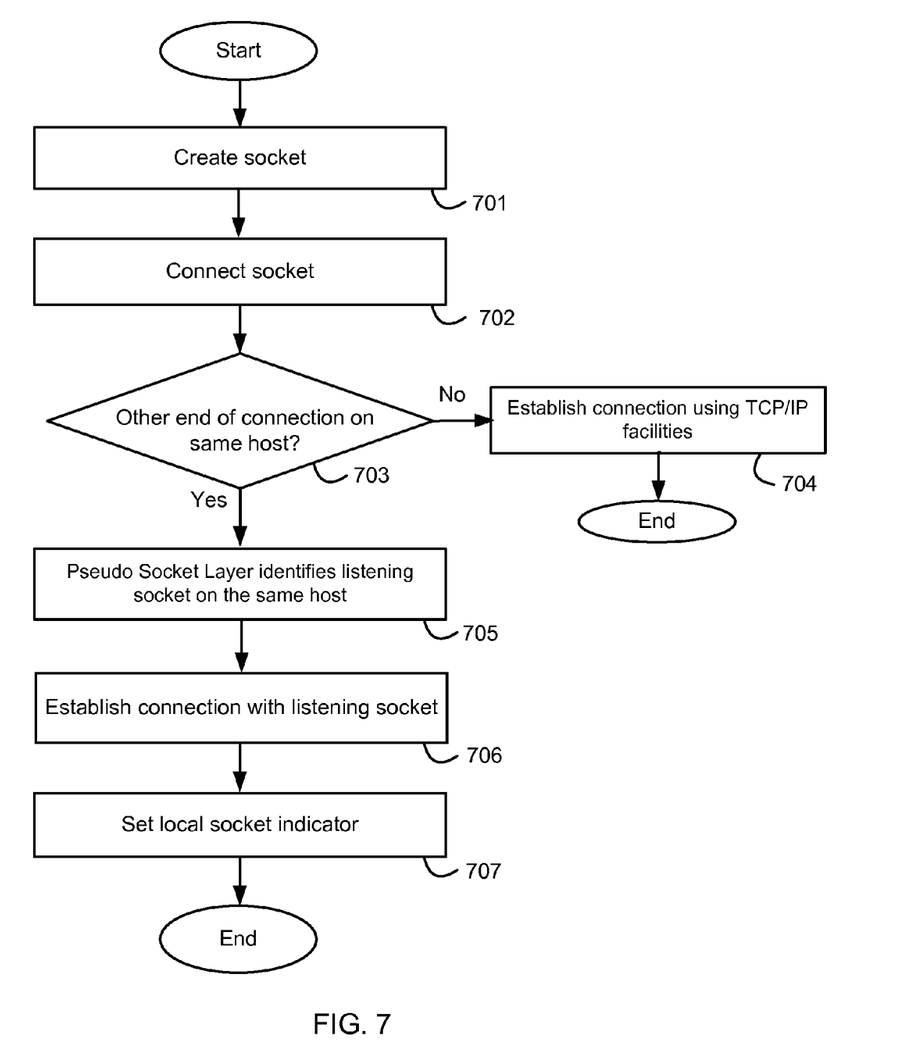
FIG. 7 is a flow chart representing a process for establishing a socket connection to support data transfer between two application processes on the same host, in accordance with an exemplary embodiment of the invention.

FIG. 7 is a flow chart representing a process for establishing a socket connection to support data transfer between two application processes on the same host, in accordance with an exemplary embodiment of the invention. The exemplary process is for the case where the underlying network is a TCP/IP network and the sockets are TCP sockets. A first application that needs to communicate with another application initially makes a socket system call to create a socket at block 701. The first application then initiates a communication link to a second application by invoking a connect system call at block 702. If the remote end of the socket connection is on a host different than the host on which the first application is running, as determined in block 703, then the connection is established using existing TCP/IP network facilities, per block 704. In the exemplary embodiments of the invention, this determination may be based on the network IP address of the remote port as compared to the network IP address of the local host The connection request is sent to the TCP layer for handling, for example, using the function pr_usrreq( ) provided in a typical TCP/IP implementation. On the other hand, if the remote end of the socket connection is on the same local host as that of the initiating application, then the pseudo socket layer 603-604 would handle the connection request. It first identifies the listening socket on the local host, per block 705, and establishes a connection with the listening socket, per block 706. The pseudo socket layer 603-604 further sets a flag, e.g., Sock_local, to indicate that the network connection is a local connection, at block 707. Subsequent communications between the two ends of the socket connection will examine the local socket flag and refer to this socket flag in performing data transfers through the socket connection.

If the initiating socket is a UDP-type socket, i.e., the socket type being SOCK_DGRAM, then the "connect" system call establishes a peer address using the pseudo socket layer 603-604. The peer address identifies the socket on the same host where all datagrams are sent on subsequent send requests by the client application.

Figure 8:
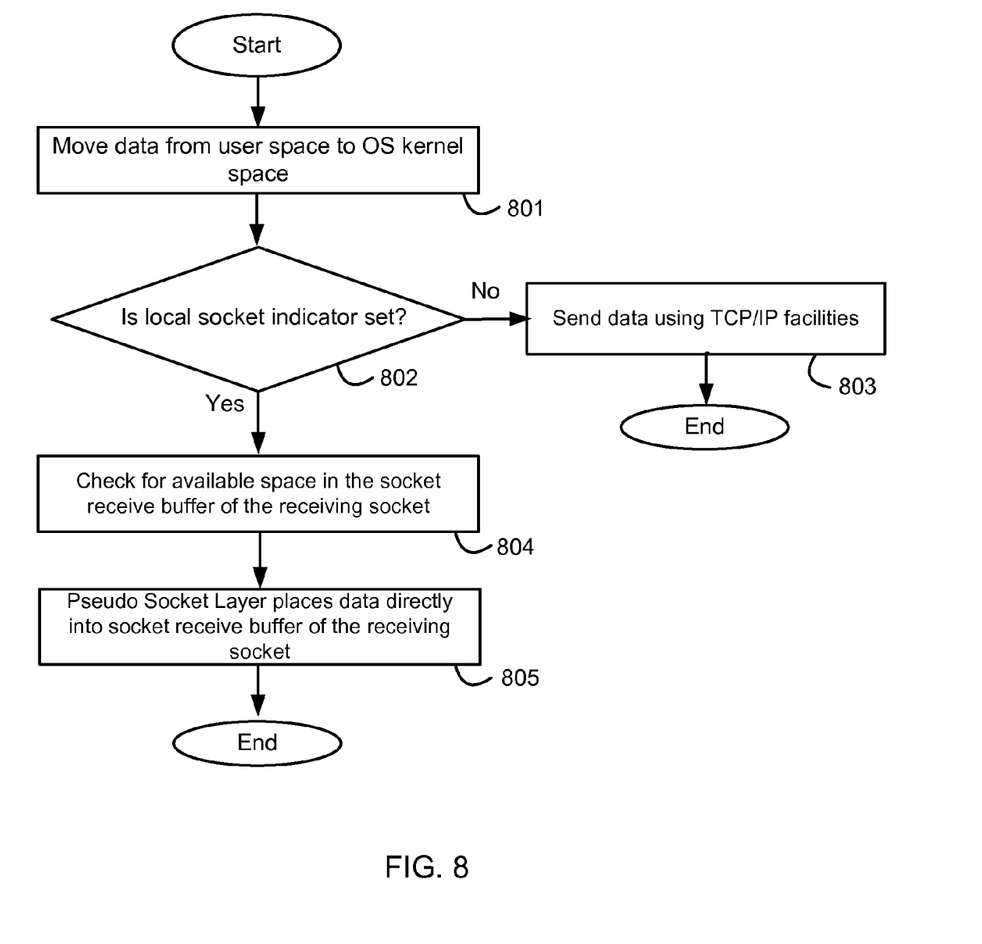
FIG. 8 is a flow chart representing a process for sending data through a socket connection between two application processes on the same host, in accordance with an exemplary embodiment of the invention.

FIG. 8 is a flow chart representing a process for sending data through a socket connection between two application processes on the same host, in accordance with an exemplary embodiment of the invention. The exemplary process is for the case where the transport layer of the underlying network is based on TCP, i.e., the sockets are SOCK_STREAM sockets. The client or server may send (or write) data to the other end of the connection by making a "send" system call to the socket application program interface. The "send" system call moves data from user space to the kernel space of the underlying operating system, at block 801. This data is copied to a buffer in the kernel space and the buffer is then put into a "socket send buffer" of the sending application. If the local socket flag is set to indicate that the other end of the network connection is on a local host, per block 802, then data to be sent is directly placed in a "socket receive buffer" of other end of the socket connection. This action is similar to the task done by the network protocol layer as it places data in socket receive buffer. The application at the other end of the connection may then read data from the socket receive buffer of its socket. To avoid buffer overrun, the pseudo socket layer checks for available space in the socket receive buffer of the destination socket, at block 804. It then places the data directly in the socket receive buffer of the destination socket, at block 805. On the other hand, if the destination socket is on a remote host, per the determination in block 802, then the API sends data to the destination socket using existing TCP/IP facilities, per block 803.

Figure 9:
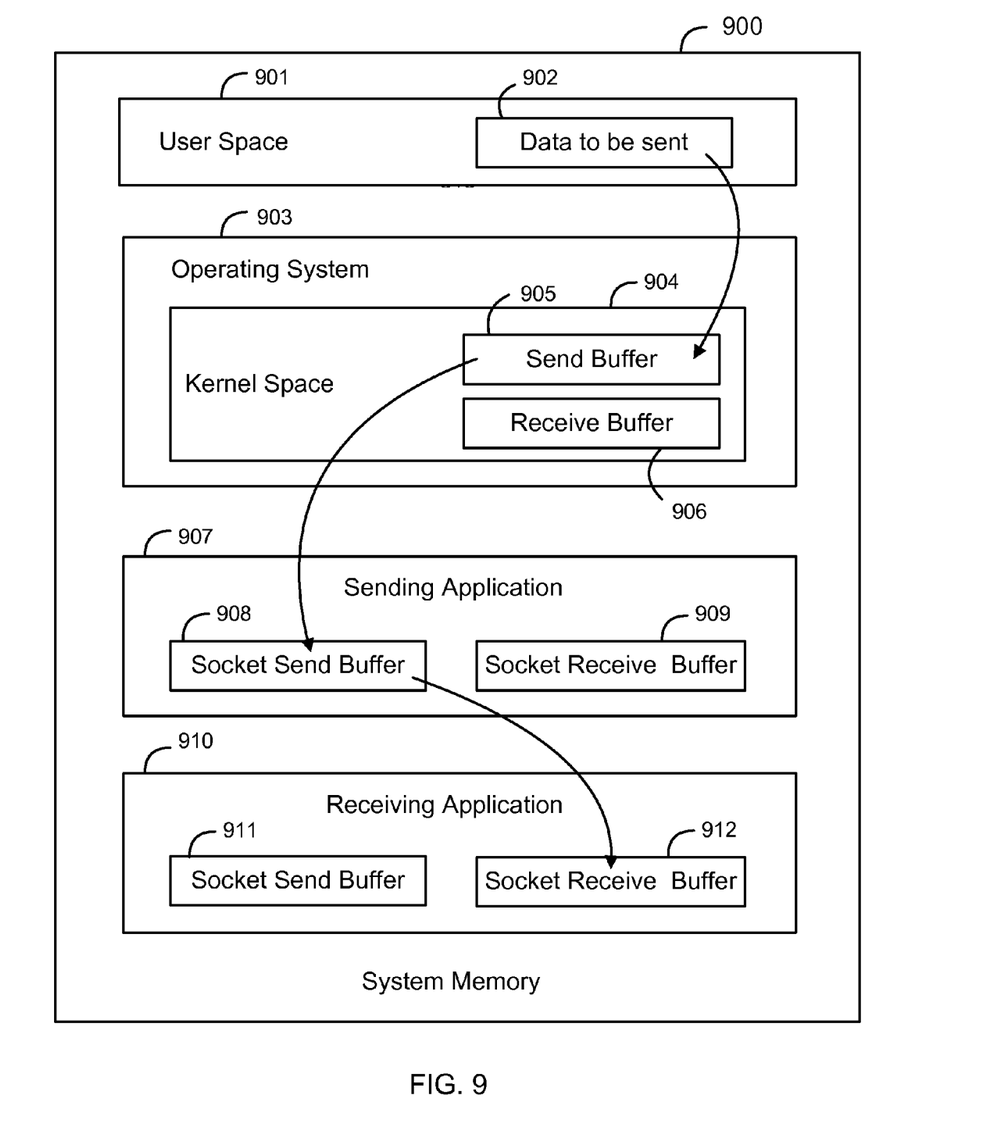
FIG. 9 illustrates an example of data being transferred through the buffers associated with a local socket connection.

FIG. 9 illustrates an example of data being transferred through the buffers associated with a local socket connection as described with reference to FIG. 8. Host system memory 900 comprises user space 901 from which data 902 is to be transferred from sending application 907 to receiving application 910. Both sending application 907 and receiving application 910 are running on the same host and thus both are present in host system memory 900. In addition, host operating system 903 also operates in memory 900 and includes kernel space 904 which typically provides send buffer 905 and receive buffer 906 for sending and receiving data, respectively. In exemplary embodiments of the invention, sending application 907 and receiving application 910 have socket send buffers 908, 911 and socket receive buffers 909, 912 for respectively sending and receiving data through a socket connection.

Per step 801 in FIG. 8, when the sending application 907 makes a "send" system call, data 902 is moved from user space 901 to kernel space 904 and put into the kernel send buffer 905. The pseudo socket layer 603-604 then places data from the kernel send buffer 905 into socket send buffer 908 of the sending application 907. If the local socket flag is set to indicate that the other end of the network connection is on the same host, then data from the socket send buffer 908 of sending application 907 is directly placed into socket receive buffer 912 of receiving application 910, per step 802 in FIG. 8. In the opposite direction, application 910 may also send data to application 907 through socket send buffer 911 and socket receive buffer 909.

Data flow through a local network connection between two applications is controlled by pseudo socket layer 603-604. The pseudo socket layer 603-604 checks for available space in the socket receive buffers 909, 912 before moving data from the socket send buffers 908, 911 into the socket receive buffers 909, 912. In the exemplary embodiments of the invention, the minimum space for this data flow may be of the size of one data buffer in memory. Data is directly moved from the socket send buffers 908, 911 to the socket receive buffers 909, 912 to eliminate the overhead of copying data from one memory location to another. Errors may be handled at the pseudo socket layer and returned to the sending and receiving applications.

The invention, as described in the exemplary embodiments, eliminates overheads associated with network protocol processing and data copying in memory during data communication when the remote end of the network connection is on the same host. It saves considerable CPU cycles and improves performance on data communication among applications and application processes, especially in database server and web server applications where network performance is always a constraint.

The subject matter described above is provided by way of illustration only and should not be construed as limiting.

Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for transferring data between two applications through a local network connection, comprising:

establishing a socket connection between the two applications;

responsive to two endpoints of the socket connection being on a host computer, transferring the data between the two applications through the socket connection using a set of socket application program interfaces in a pseudo socket layer, wherein the pseudo socket layer is between an application layer and a transport layer, wherein each socket application program interface in the set of socket application program interfaces has a set of local socket buffers for sending and receiving the data, and wherein transferring the data between the two applications through the socket connection comprises:

transferring the data from a user memory space within a first application of the two applications to a send buffer within a first kernel space of a first operating system associated with the first application;

transferring the data from the send buffer within the first kernel space to a socket send buffer of a first socket application program interface of the set of socket application program interfaces associated with the first application;

transferring the data from the socket send buffer of the first socket application program interface to a socket receive buffer of a second socket application program interface of the set of socket application program interfaces associated with a second application of the two applications;

transferring the data from the socket receive buffer of the second socket application program interface to a receive buffer within a second kernel space of a second operating system associated with the second application; and transferring the data from the receive buffer within the second kernel space to a user memory space within the second application.

2. The method of claim 1, further comprising transferring the data between the two applications using an underlying network protocol if the two endpoints of the socket connection are not on the host computer.

3. The method of claim 2, wherein the underlying network protocol is based on TCP/IP protocols.

4. The method of claim 2, wherein the underlying network protocol is based on User Datagram Protocol (UDP).

5. The method of claim 1, wherein the two endpoints of the socket connection are not on the same host computer if the two endpoints are associated with different network addresses.

6. The method of claim 1, wherein the establishing of the socket connection comprises creating a socket by each of the two applications and connecting to the socket.

7. The method of claim 1, wherein the establishing of the socket connection comprises identifying a listening socket on the host computer hosting the two applications and establishing the socket connection with the listening socket, if the two endpoints of the socket connection are on the host computer.

8. The method of claim 7, further comprising setting a local socket indicator for use in subsequent communications between the two applications.

9. The method of claim 1, wherein transferring the data between the two applications through the socket connection further comprises:

prior to transferring the data from the socket send buffer of the first socket application program interface to the socket receive buffer of the second socket application program interface, checking for available space in the socket receive buffer of the second socket application program interface;

responsive to the available space being present, transferring the data from the socket send buffer of the first socket application program interface to the socket receive buffer of the second socket application program interface; and responsive to the available space failing to be present, sending an error signal to the first application.

10. A computer program product for transferring data between two applications through a local network connection, the computer program product having a non-transitory computer readable storage medium comprising program code operable to establish a socket connection between the two applications, and, responsive to two endpoints of the socket connection being on a host computer, transfer the data between the two applications through the socket connection using a set of socket application program interfaces in a pseudo socket layer, wherein the pseudo socket layer is between an application layer and a transport layer, wherein each socket application program interface in the set of socket application program interfaces has a set of local socket buffers for sending and receiving the data, and wherein the computer program code to transfer the data between the two applications through the socket connection comprises computer program code to:

transfer the data from a user memory space within a first application of the two applications to a send buffer within a first kernel space of a first operating system associated with the first application;

transfer the data from the send buffer within the first kernel space to a socket send buffer of a first socket application program interface of the set of socket application program interfaces associated with the first application;

transfer the data from the socket send buffer of the first socket application program interface to a socket receive buffer of a second socket application program interface of the set of socket application program interfaces associated with a second application of the two applications;

transfer the data from the socket receive buffer of the second socket application program interface to a receive buffer within a second kernel space of a second operating system associated with the second application; and transfer the data from the receive buffer within the second kernel space to a user memory space within the second application.

11. The computer program product of claim 10, wherein the two applications establish the socket connection and transfer the data by making system calls to the set of socket application program interfaces.

12. The computer program product of claim 10, further comprising code operable to create a socket and to connect to the socket.

13. The computer program product of claim 10, wherein the computer program code to transfer the data between the two applications through the socket connection comprises computer program code to:

prior to transferring the data from the socket send buffer of the first socket application program interface to the socket receive buffer of the second socket application program interface, check for available space in the socket receive buffer of the second socket application program interface;

responsive to the available space being present, transfer the data from the socket send buffer of the first socket application program interface to the socket receive buffer of the second socket application program interface; and responsive to the available space failing to be present, send an error signal to the first application.

14. A system for transferring data between two applications through a local network connection, comprising a set of socket application program interfaces coupled to the two applications for establishing a socket connection between the two applications, and, responsive to two endpoints of the socket connection being on a host computer, transferring the data between the two applications through the socket connection using the set of socket application program interfaces in a pseudo socket layer, wherein the pseudo socket layer is between an application layer and a transport layer, wherein each socket application program interface in the set of socket application program interfaces has a set of local socket buffers for sending and receiving the data, and wherein transferring the data between the two applications through the socket connection comprises:

transferring the data from a user memory space within a first application of the two applications to a send buffer within a first kernel space of a first operating system associated with the first application;

transferring the data from the send buffer within the first kernel space to a socket send buffer of a first socket application program interface of the set of socket application program interfaces associated with the first application;

transferring the data from the socket send buffer of the first socket application program interface to a socket receive buffer of a second socket application program interface of the set of socket application program interfaces associated with a second application of the two applications;

transferring the data from the socket receive buffer of the second socket application program interface to a receive buffer within a second kernel space of a second operating system associated with the second application; and transferring the data from the receive buffer within the second kernel space to a user memory space within the second application.

15. The system of claim 14, wherein the two endpoints of the socket connection are not on the host computer if the two endpoints are associated with different network addresses.

16. The system of claim 14, wherein the two applications create a socket and connect to the socket to establish the socket connection through the set of socket application program interfaces.

17. The system of claim 14, wherein the set of socket application program interfaces enables the two applications to identify a listening socket on the host computer hosting the two applications and establish the socket connection with the listening socket, if the two endpoints of the socket connection are on the host computer.

18. The system of claim 14, wherein an underlying network protocol is based on TCP/IP protocols.

19. The system of claim 14, wherein transferring the data between the two applications through the socket connection further comprises:

prior to transferring the data from the socket send buffer of the first socket application program interface to the socket receive buffer of the second socket application program interface, checking for available space in the socket receive buffer of the second socket application program interface;

responsive to the available space being present, transferring the data from the socket send buffer of the first socket application program interface to the socket receive buffer of the second socket application program interface; and responsive to the available space failing to be present, sending an error signal to the first application.

* * * * *